L. F. BETTS.
BROILER.
APPLICATION FILED APR. 18, 1910.
1,007,323.
Patented Oct. 31, 1911.
2 SHEETS—SHEET 1.
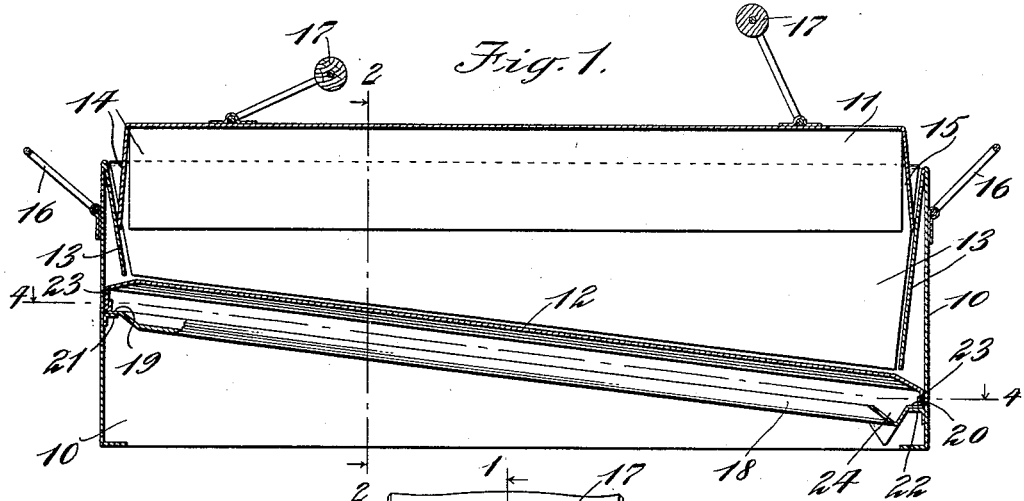
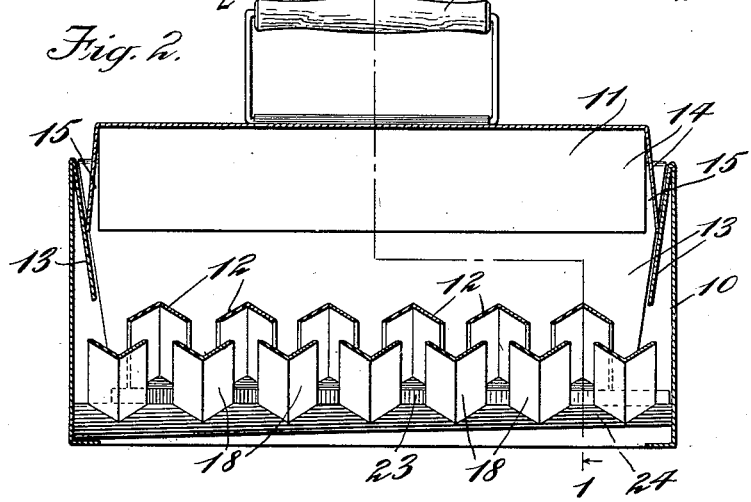
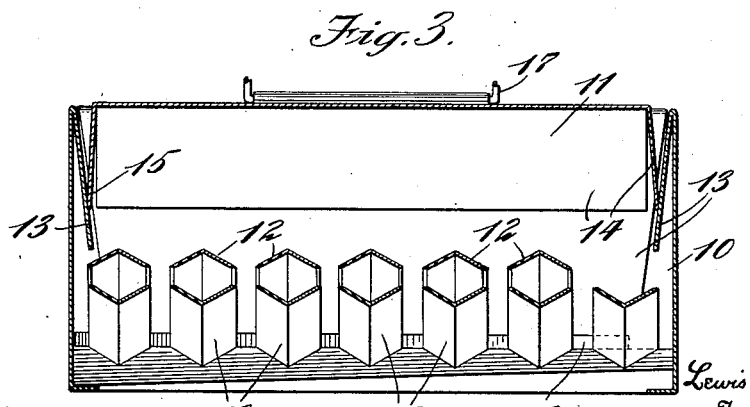
Witnesses:
Lewis F. Betts
Inventor
By his Attorney Lewis J. Doolittle

L. F. BETTS.
BROILER.
APPLICATION FILED APR. 18, 1910.

1,007,323.

Patented Oct. 31, 1911.

2 SHEETS—SHEET 2.

Witnesses:
Geo. C. Cheney
Benj. C. Lewis

Lewis F. Betts
Inventor
By his Attorney Lewis J. Doolittle

UNITED STATES PATENT OFFICE.

LEWIS F. BETTS, OF NEW YORK, N. Y., ASSIGNOR TO ABBOT A. LOW, OF HORSESHOE, NEW YORK, AND MAURICE J. WOHL AND HARRY HERTZBERG, OF NEW YORK, N. Y., TRUSTEES.

BROILER.

1,007,323.   Specification of Letters Patent.   Patented Oct. 31, 1911.

Application filed April 18, 1910. Serial No. 556,044.

*To all whom it may concern:*

Be it known that I, LEWIS F. BETTS, a citizen of the United States, and resident of the city of New York, borough of Brooklyn, county of Kings, and State of New York, have invented certain new and useful Improvements in Broilers, of which the following is a specification.

This invention relates to broilers, and the improvements constituting the invention are specially applicable to portable incased broilers designed to be placed over flaming or glowing fires.

The object of the invention is to provide a novel arrangement of bars and drip troughs, whereby, when the broiler is used over a liquid or gaseous fuel burner, the troughs may be alternated with the bars and in a lower plane, to catch the drippings and thus protect the burner, but when the broiler is used over glowing fires, the spaces between the bars may be left free and unobstructed.

A further object of the invention is to provide a cheap and durable portable broiler, comprising a casing having side walls, an open bottom, removable cover, and bars in the casing, which will broil meats in a superior manner.

With these and other objects in view, as will become apparent as the specification proceeds, the invention consists in the constructions, arrangements and combinations hereinafter described and in the claims particularly pointed out.

Figure 4:
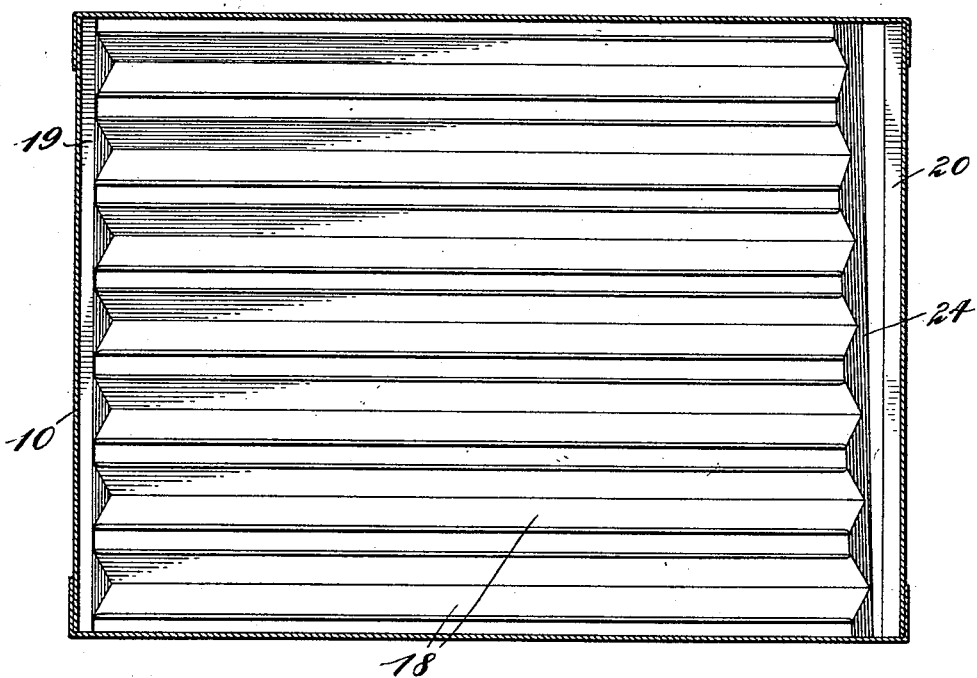
Figure 5:
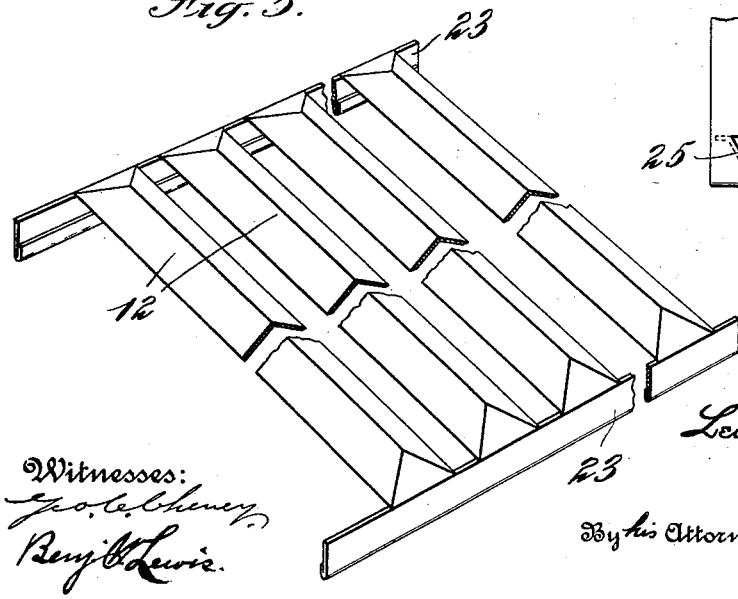
Figure 6:
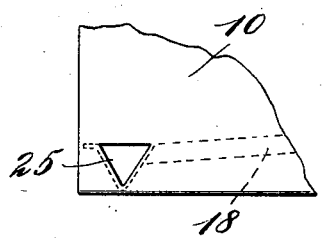

Referring now to the drawings for a brief description thereof, Figure 1 is a vertical, longitudinal section through a broiler embodying the invention, said view being taken on the line 1—1 of Fig. 2; Fig. 2 is a vertical transverse section, taken on the line 2—2 of Fig. 1; Fig. 3 is a view similar to the last, but with the bars shifted to superposed position; Fig. 4 is a sectional plan on the line 4—4 of Fig. 1; Fig. 5 is a perspective view, broken away, of the upper, slidable member carrying the meat-supporting bars; and Fig. 6 is a detail elevation taken at one corner of the casing.

A casing 10 has an open bottom through which heated air rises into its interior. A cover 11 may be removably supported over the top of the casing; and meat-supporting bars 12 are supported within the casing. The broiler so constituted is adapted to be placed over either flaming or glowing fires and to broil meats quickly and with improved flavor. In the particular construction illustrated, the casing 10 and the cover 11 are made from sheet metal. Resilient means are provided for holding the cover over the interior of the casing at various elevations and positions. While the embodiments of such means may be varied widely, I have shown the side walls of the casing 10 as being bent downward and inward at the top, presenting internal spring flanges 13. I have also shown the cover 11 having its side walls 14 separated from each other at the corners, as indicated at 15, and slightly inclined outward at their lower parts, thus presenting spring means for coöperation with the spring flanges 13. The side walls of the casing 10 may have handles 16; and the cover 11 may have handles 17. In addition to the set of bars 12, I provide another, lower set of bars 18. The upper sides of these bars 18 are channeled, as shown, to constitute drip troughs. These two sets of bars are relatively movable, so that they may be placed in staggered relation, as shown in Fig. 2, or in superposed relation, as shown in Fig. 3. In the best embodiment of the invention, this is accomplished by rendering the bars 12 movable, while the bars 18 are preferably stationarily supported in the casing 10. As shown, the bars 18 are connected at their ends by transverse flanges 19 and 20, which rest upon ledges 21 and 22, secured to the inner sides of the walls of the casing 10. The flanges 19 and 20 extend the full width of the casing 10, so that the bars 18 are held stationary as to lateral movement. The member consisting of the bars 18 and the flanges 19 and 20 may, however, be removed for cleaning, by lifting said flanges off the ledges 21 and 22. The bars 12, in the illustrated embodiment of the invention, are connected at their ends by depending strips 23, which are slidably supported by the ledges 21 and 22. As shown, the strips 23 may slide immediately on the flanges 19 and 20.

Stop means are provided for limiting the movement of the bars 12 in opposite directions, arresting the movement of the bars when they have reached a position alternately overlapping the bars 18, as shown in Fig. 2, or directly above said bars 18, as shown in Fig. 3. It will be obvious that there may be many embodiments of such means. In the illustrated embodiment, the ends of the strips 23 and the opposed side walls of the casing 10 constitute coöperating stops for so limiting the movement of the bars 12.

In the best form of the invention, the bars 12 are inverted V-shape in cross section, and the bars 18 are V-shaped in cross-section. By means of this reversed concavo-convex construction of the two bars I am enabled to secure improved broiling effects when the broiler is used over a liquid or gaseous fuel burning stove.

When the parts are in position as shown in Fig. 2, not only will the juices be caught and prevented from clogging the burner, but the bars 18 and 12 will present baffle surfaces causing the rising heated air to flow in a tortuous manner and preventing any direct contact of the flame with the meat.

The most desirable results in the way of cheapness and simplicity of construction are attained by cutting and bending the two members, one consisting of the bars 12 and the strips 23, and the other consisting of the bars 18 and the flanges 19 and 20, each out of a single sheet of metal.

As clearly shown in Fig. 1, the bars 12 and 18 are inclined, whereby drippings received in the channeled bars 18 are caused to flow along the same. At the low ends of these bars may be provided a receiving channel 24, which may be formed in the flange 20. Preferably, this channel 24 is also inclined, and may discharge through an opening 25 in one of the side walls of the casing, as shown in Fig. 6.

In operation, the broiler is placed over a fire, and the bars 12 are shifted either to the position shown in Fig. 2 or to the position shown in Fig. 3, according to the nature of the fire, or according to whether it is desired to preserve the drippings, or in accordance with other conditions. When the parts are in the position shown in Fig. 3, the heated gases have free and unobstructed passage directly upward between the bars 12. When the bars overlap, as shown in Fig. 2, the heated gases flow in a tortuous manner between the bars, and the drippings are caught in the bars 18. The cover 11 may be put on at a variety of heights and angles, and there held by the resilient holding means, whereby the chamber above the bars may be made larger or smaller and different cooking effects may be obtained.

What is claimed as new is:

1. A broiler comprising an upper set of bars which are convex above and concave below, a lower set of bars which are concave above and convex below, and means movably supporting one of said sets of bars, whereby said bars may be positioned in overlapped alternate relation or in superposed relation.

2. A broiler comprising upper and lower sets of bars, means movably supporting one of said sets of bars, whereby said bars may be staggered or superposed, and means limiting the movement of said set of bars in opposite directions at the staggered and superposed positions.

3. A broiler comprising a portable open-bottom casing, upper and lower sets of bars therein, the lower bars having drip channels, one of said sets of bars having transverse members connecting their opposite ends, and means movably supporting said members for longitudinal sliding movement, whereby said bars may be either staggered or superposed.

Signed at Brooklyn, N. Y., in the county of Kings, State of New York, this 8th day of April, 1910.

LEWIS F. BETTS.

Witnesses:
H. HERTZBERG,
M. J. WOHL.

---

Copies of this patent may be obtained for five cents each, by addressing the "Commissioner of Patents, Washington, D. C."